United States Patent
Krone et al.

(10) Patent No.: US 12,209,391 B2
(45) Date of Patent: Jan. 28, 2025

(54) CONTROLLING MACHINE OPERATION BASED ON VALIDATION OF MACHINE DATA

(71) Applicant: Caterpillar Inc., Peoria, IL (US)

(72) Inventors: Bradley Paul Krone, Dunlap, IL (US); Joseph Leo Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 445 days.

(21) Appl. No.: 17/646,498

(22) Filed: Dec. 30, 2021

(65) Prior Publication Data

US 2023/0228065 A1 Jul. 20, 2023

(51) Int. Cl.
*E02F 9/26* (2006.01)
*E02F 9/20* (2006.01)
*G05D 1/00* (2024.01)

(52) U.S. Cl.
CPC .............. *E02F 9/264* (2013.01); *E02F 9/205* (2013.01); *E02F 9/267* (2013.01); *G05D 1/0061* (2013.01)

(58) Field of Classification Search
None
See application file for complete search history.

(56) References Cited

U.S. PATENT DOCUMENTS

| | | | |
|---|---|---|---|
| 6,683,432 B2 * | 1/2004 | Griffis ................ | G05B 19/4061 340/541 |
| 8,145,394 B2 | 3/2012 | Chiorean et al. | |
| 8,843,279 B2 | 9/2014 | Tafazoli Bilandi et al. | |
| 8,924,098 B2 | 12/2014 | Zhdanov et al. | |
| 9,580,104 B2 | 2/2017 | Green et al. | |
| 9,593,469 B2 | 3/2017 | Taylor et al. | |
| 9,822,507 B2 | 11/2017 | Singh et al. | |
| 10,614,588 B2 | 4/2020 | Chandrasekar et al. | |
| 2002/0170210 A1* | 11/2002 | Ogawa ...................... | E02F 9/26 37/348 |
| 2005/0177292 A1* | 8/2005 | Okamura .............. | E02F 9/2207 701/50 |
| 2008/0258889 A1* | 10/2008 | Prohaska ................. | E02F 9/26 340/438 |
| 2018/0066415 A1* | 3/2018 | Friend ..................... | E02F 9/262 |
| 2019/0138000 A1* | 5/2019 | Hammond ........ | B60W 50/0205 |
| 2020/0211394 A1* | 7/2020 | King .................... | G05D 1/0289 |
| 2020/0337235 A1* | 10/2020 | Blank .................. | A01M 21/043 |
| 2021/0284262 A1* | 9/2021 | Sardes .................... | G06Q 50/40 |
| 2021/0337715 A1* | 11/2021 | Fujimoto ............. | G05D 1/0038 |

(Continued)

*Primary Examiner* — Hunter B Lonsberry
*Assistant Examiner* — Robert L Pinkerton

(57) ABSTRACT

A device may receive machine data indicating a pose of one or more components of a machine. The machine data may be generated based on first data from one or more first sensor devices associated with the machine. The device may generate validation data to validate the machine data. The validation data may be generated based on second data from a second set of sensor devices. The device may perform a comparison of the machine data and the validation data and determine, based the comparison, whether the machine data is validated or not validated. The device may selectively control an operation of the machine based on the machine data. Based on determining that the machine data is validated, the operation may be controlled based on the machine data. The operation may be controlled without the machine data based on determining that the machine data is not validated.

20 Claims, 3 Drawing Sheets

(56) References Cited

U.S. PATENT DOCUMENTS

| | | | | |
|---|---|---|---|---|
| 2023/0177719 A1* | 6/2023 | Babin | ................ | G06T 7/74 |
| | | | | 701/445 |
| 2023/0183943 A1* | 6/2023 | Kadono | ................ | H04Q 9/00 |
| | | | | 701/50 |
| 2024/0093463 A1* | 3/2024 | Sakisaka | ................ | E02F 3/439 |

* cited by examiner

CONTROLLING MACHINE OPERATION BASED ON VALIDATION OF MACHINE DATA

TECHNICAL FIELD

The present disclosure relates generally to controlling an operation of a machine and, for example, to controlling an operation of a machine based on validation of machine data.

BACKGROUND

A dozer may include multiple sensor devices that generate data that may be used to estimate a position and an orientation of an implement of the dozer and to estimate a velocity of the dozer. In some instances, the estimated position, the estimated orientation, and/or the estimated velocity may be inaccurate. Operating the dozer based on inaccurate data may result in the dozer performing unintended operations. Such unintended operations may cause damage to the dozer and/or to other machines.

The system of the present disclosure solves one or more of the problems set forth above and/or other problems in the art.

SUMMARY

In some implementations, a method performed by a device includes receiving machine data indicating a pose of one or more components of a machine, wherein the machine data is generated based on first data from one or more first sensor devices associated with the machine; generating validation data to validate the machine data, wherein the validation data is generated based on second data from a second set of sensor devices, associated with the machine, different than the one or more first sensor devices; performing a comparison of the machine data and the validation data; determining, based the comparison, whether the machine data is validated or not validated; and selectively controlling an operation of the machine based on the machine data, wherein, based on determining that the machine data is validated, the operation is controlled based on the machine data, and wherein the operation is controlled without the machine data based on determining that the machine data is not validated.

In some implementations, a device includes one or more memories; and one or more processors configured to: receive machine data indicating a pose of one or more components of a machine and indicating a velocity of the machine, wherein the machine data is generated based on first data from one or more first devices associated with the machine; generate validation data to validate the machine data, wherein the validation data is generated based on second data from a second set of devices, associated with the machine, different than the one or more first devices; determine, using the validation data, whether the machine data is validated or not validated; and selectively control an operation of the machine based on the machine data, wherein, based on determining that the machine data is validated, the operation is controlled based on the machine data, and wherein the operation is controlled without the machine data based on determining that the machine data is not validated.

In some implementations, a system comprising: one or more first devices associated with a machine; a second set of devices, associated with the machine, different than the one or more first devices; and a machine controller configured to: receive machine data indicating one or more characteristics of the machine, wherein the machine data is generated based on first data from the one or more first devices; determine whether validation data, that validates the machine data, can be generated to validate the machine data; generate the validation data based on determining whether the validation data can be generated, wherein the validation data is generated based on second data from the second set of devices; determine, based the validation data, whether the machine data is validated or not validated; and selectively controlling an operation of the machine based on the machine data, wherein, based on determining that the machine data is validated, the operation is controlled based on the machine data, wherein, based on determining that the validation data cannot be generated, the operation is controlled based on the machine data, and wherein the operation is controlled without the machine data based on determining that the machine data is not validated.

DETAILED DESCRIPTION

Figure 1:
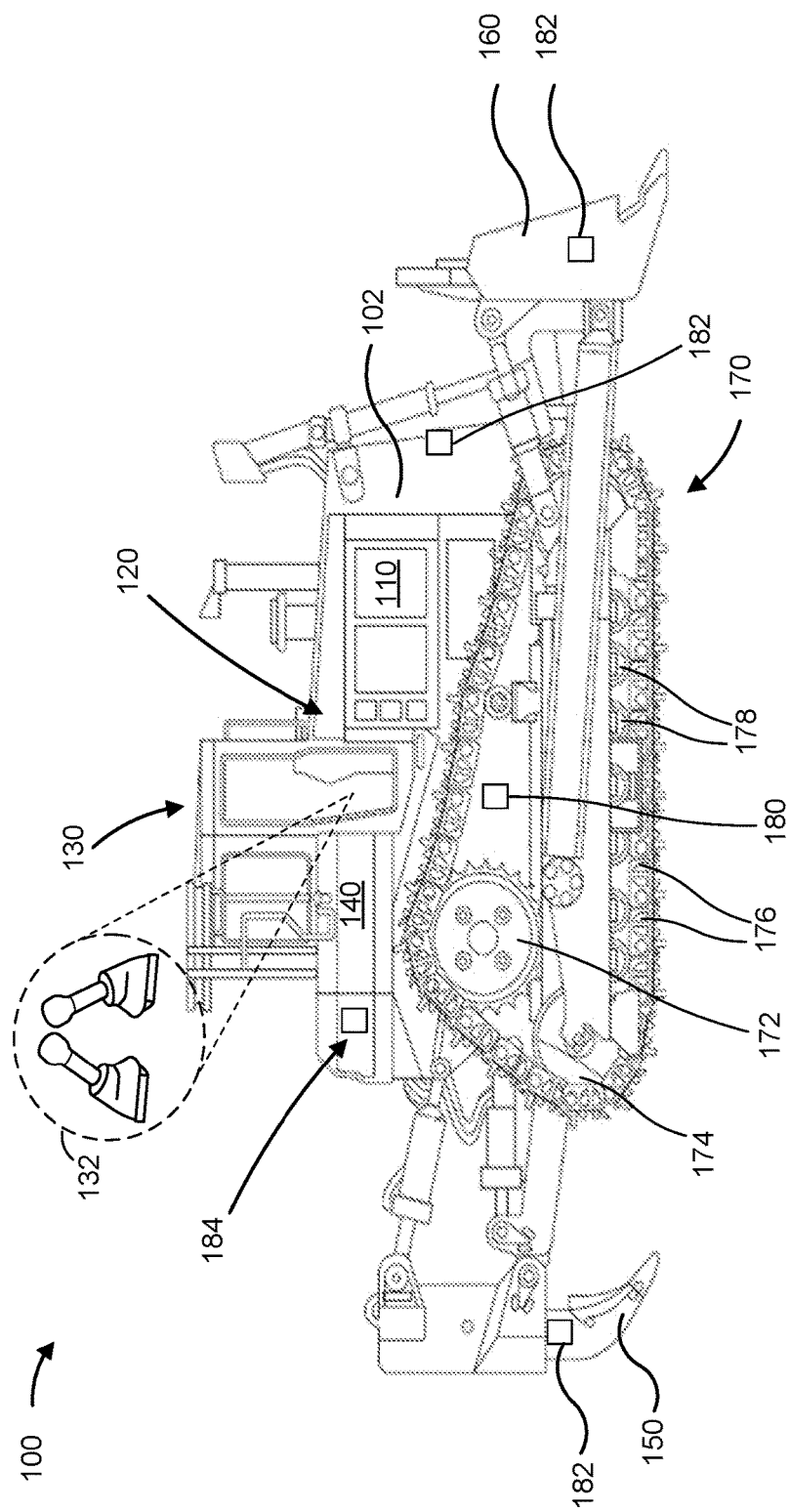
FIG. 1 is a diagram of an example machine described herein.

Implementations described herein are directed to validating machine data indicating one or more characteristics of a machine. For example, implementations described herein are directed to a device (e.g., a machine controller) that generates validation data that identifies constraints associated with the one or more characteristics. The device may validate the machine data based on the validation data. For example, the device may validate the machine data by comparing the machine data and the validation data.

In some instances, the one or more characteristics may include an estimated pose of one or more components of the machine (e.g., a blade assembly, a ripper assembly, and a chassis of the machine). The estimated pose may include a position and/or an orientation of the one or more components. Additionally, or alternatively, to including the estimated pose, the estimated one or more characteristics may include an estimated velocity of the machine, an estimated pitch of the machine, an estimated yaw of the machine, among other examples.

The machine data may be generated based on first data from one or more first devices of the machine, such as a global positioning system (GPS) device and/or one or more inertial measurement units (IMUs). In some instances, the machine data may be generated by a pose system associated with the GPS device and/or the one or more IMUs. The validation data may be generated based on second data from one or more second devices of the machine. The one or more second devices may include a velocity sensor device, a load sensor device, a pressure sensor device, one or more operator controls, among other examples.

In some instances, the device may determine whether the machine data satisfies the constraints and may validate the machine data based on determining whether the machine data satisfies the constraints. For example, the device may determine that the machine data is validated based on determining that the machine data satisfies the constraints (e.g., based on determining that the machine data is accurate). Alternatively, the device may determine that the machine data is not validated based on determining that the machine data does not satisfy the constraints (e.g., based on determining that the machine data is inaccurate).

In some examples, the machine data may be used by one or more features of the machine to control the operation of the machine. In this regard, in some instances, the device may disable the one or more features based on determining that the machine data is not validated. Alternatively, the system may enable the one or more features based on determining that the machine data is validated, thereby enabling the one or more features to use the machine data.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

FIG. 1 is a diagram of an example machine 100 described herein. As shown in FIG. 1, machine 100 is embodied as an earth moving machine, such as a dozer. Alternatively, machine 100 may be another machine such as an excavator, a wheel loader, a motor grader, among other examples of machines used in the industry described above.

As shown in FIG. 1, machine 100 includes a chassis 102, an engine 110, a sensor system 120, an operator cabin 130, operator controls 132, a machine controller 140, a rear attachment 150, a front attachment 160, ground engaging members 170, sprocket 172, one or more idlers 174, one or more track links 176, one or more rollers 178, a transmission control system 180, one or more IMUs 182, and a GPS device 184.

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., machine controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a velocity sensor device, a load sensor device, a pressure sensor device, a vibration sensor device, a motion sensor device, among other examples.

Operator cabin 130 includes an integrated display (not shown) and operator controls 132. Operator controls 132 may include one or more input components (e.g., integrated joysticks, push-buttons, control levers, and/or steering wheels) to control an operation of machine 100. For example, operator controls 132 may be used to control an operation of one or more implements of machine 100 (e.g., rear attachment 150 and/or front attachment 160) and/or control an operation of ground engaging members 170.

For an autonomous machine, operator controls 132 may not be designed for use by an operator and, rather, may be designed to operate independently from an operator. In this case, for example, operator controls 132 may include one or more input components that provide an input signal for use by another component without any operator input.

Machine controller 140 (e.g., an electronic control module (ECM)) may control and/or monitor operations of machine 100. For example, machine controller 140 may control and/or monitor the operations of machine 100 based on signals from operator controls 132, from sensor system 120, from IMUs 182, and/or GPS device 184. Machine controller 140 may enable or disable one or more features that control the operations of machine 100 based on the signals from sensor system 120, from operator controls 132, from IMUs 182, and/or from GPS device 184, as described in more detail below.

Rear attachment 150 may include a ripper assembly, a winch assembly, and/or a drawbar assembly. Front attachment 160 may include a blade assembly. Ground engaging members 170 may be configured to propel machine 100. Ground engaging members 170 may include wheels, tracks, rollers, and/or similar components, for propelling machine 100. Ground engaging members 170 may include an undercarriage that includes tracks (as shown in FIG. 1). The tracks may include track links 176.

Sprocket 172 may include one or more sprocket segments. Sprocket 172 may be configured to engage with ground engaging members 170 and to drive ground engaging members 170. In some examples, one or more idlers 174 and/or one or more rollers 178 may guide the tracks as the tracks rotate to propel machine 100. In some examples, sprocket 172 may be part of a transmission of machine 100.

Transmission control system 180 may include one or more devices that are capable of receiving, generating, storing, processing, and/or providing signals that may be used to control the transmission of machine 100. As shown in FIG. 1, IMUs 182 are installed at different positions on components or portions of machine 100, such as, for example, on chassis 102, on rear attachment 150, and/or on front attachment 160.

An IMU 182 includes one or more devices that are capable of receiving, generating, storing, processing, and/or providing signals that may be used to determine a position and orientation of a component, of machine 100, on which the IMU 182 is installed. For example, IMU 182 may include one or more accelerometers and/or one or more gyroscopes.

The one or more accelerometers and/or the one or more gyroscopes generate and provide signals that can be used to determine a position and orientation of the IMU 182 relative to a frame of reference and, accordingly, a position and orientation of the component. While the example discussed herein refers to IMUs 182, the present disclosure is applicable to using one or more other types of sensor devices that may be used to determine a position and orientation of a component of machine 100. GPS device 184 may include one or more devices that are capable of receiving, generating, storing, processing, and/or providing signals that may be used to determine a location of machine 100, a velocity of machine 100, a movement of machine 100, among other examples.

In some implementations, GPS device 184, one or more IMUs 182, and/or one or more other sensor devices may be associated with a pose system that is configured to generate machine data indicating one or more characteristics of machine 100. GPS device 184 and/or the one or more IMUs 182 may generate first data that may be used by the pose system to generate the machine data. In some examples, the one or more characteristics may include an estimated pose of one or more components of machine 100, an estimated velocity of machine 100, an estimated pitch of machine 100, an estimated yaw of machine 100, among other examples. The one or more components may include chassis 102, rear attachment 150, and/or front attachment 160.

The first data may be provided periodically (e.g., every twenty milliseconds, every fifty milliseconds, among other examples). Additionally, or alternatively, the first data may be provided based on a trigger (e.g., based on receiving a request from machine controller 140). Operator controls 132 and/or sensor system 120 may generate second data that is used by machine controller 140 to generate validation data. The validation data may identify one or more constraints associated with the one or more characteristics. Machine controller 140 may use the validation data to validate the machine data. The second data may be provided in a manner similar to the manner in which the first data is provided.

As indicated above, FIG. 1 is provided as an example. Other examples may differ from what was described in connection with FIG. 1.

Figure 2:
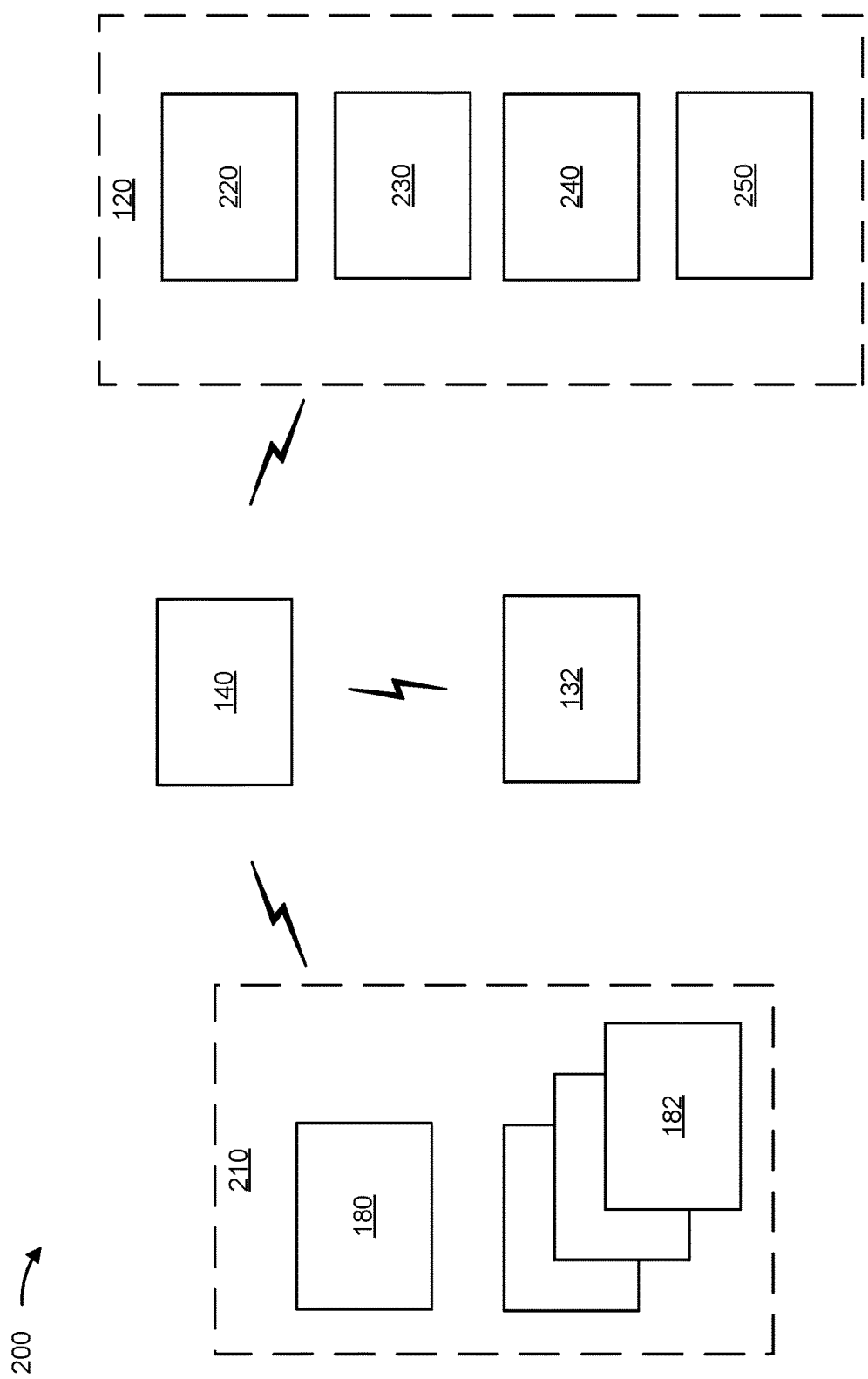
FIG. 2 is a diagram of an example system described herein.

FIG. 2 is a diagram of an example system 200 described herein. As shown in FIG. 2, system 200 includes sensor system 120, operator controls 132, machine controller 140, and a pose system 210. Some of the elements of FIG. 2 have been described above in connection with FIG. 1. Sensor system 120 may include a velocity sensor device 220, a load sensor device 230, a pressure sensor device 240, and a temperature sensor device 250. The velocity sensor device may include one or more devices that sense a velocity of machine 100 and generate machine velocity data indicating the velocity of machine 100.

Load sensor device 230 may include one or more devices that sense a load of machine 100 and generate machine load data indicating the load of machine 100. The load may include a transmission torque of machine 100. Pressure sensor device 240 may include one or more devices that sense a pressure of hydraulic fluids and generate machine pressure data indicating the pressure of the hydraulic fluids. The hydraulic fluids may be used by one or more hydraulic systems to control an operation of machine 100 (e.g., to control an operation of the one or more implements). Temperature sensor device 250 may include one or more devices that sense a temperature of the hydraulic fluids and generate machine temperature data indicating the temperature of the hydraulic fluids.

Operator controls 132 may be configured to generate operator controls data. The operator controls data may include valve command data identifying a valve command for controlling the one or more implements, include steering command data identifying a steering command of machine 100, and/or include gear setting data identifying a gear setting of machine 100 and/or identifying a gear change. The valve command may control one or more valves associated with the one or implements.

Pose system 210 may include one or more devices configured to generate the machine data. For example, pose system 210 may receive the first data from GPS device 184, one or more IMUs 182, a light detection and ranging (LIDAR) device, a radio detection and ranging (RADAR) device, among other examples. Pose system 210 may generate the machine data by combining the first data received from GPS device 184, one or more IMUs 182, the LIDAR device, the RADAR device, among other examples. The machine data may include pose data identifying the pose (e.g., the pose estimated by pose system 210) and/or velocity data identifying the velocity (e.g., the velocity estimated by pose system 210). Pose system 210 may generate and/or provide the machine data (e.g., to machine controller 140) periodically and/or based on a trigger in a manner similar to the manner described above in connection with the first data and the second data.

As shown in FIG. 2, GPS device 184 and/or one or more IMUs 182 may be included pose system 210. In some examples, GPS device 184 and/or one or more IMUs 182 may be separate from pose system 210. In some instances, the one or more devices of pose system 210 may include a controller similar to machine controller 140. The controller may be configured to generate the machine data based on the first data provided by GPS device 184 and/or one or more IMUs 182.

Machine controller 140 may include one or more processors and one or more memories. A processor may be implemented in hardware, firmware, and/or a combination of hardware and software. A processor may be capable of being programmed to perform a function. Memory may store information and/or instructions for use by a processor to perform the function. For example, when performing the function, machine controller 140 may validate the machine data based on the validation data.

In some examples, machine controller 140 may be included in machine 100, as illustrated above in FIG. 1. Alternatively, machine controller 140 may be included in a device external with respect to machine 100. For instance, machine controller 140 may be part of a back office system.

In some situations, prior to validating the machine data, machine controller 140 may determine whether one or more conditions are satisfied. For example, prior to generating the validation data, machine controller 140 may determine whether the load associated with the machine satisfies a load threshold, determine whether the temperature of the hydraulic fluids satisfies a temperature threshold, determine whether the pressure of the hydraulic fluids satisfies a pressure threshold, determine whether a movement of machine 100 is detected, and/or determine whether a steering command is detected, among other examples.

Machine controller 140 may determine that the one or more conditions are not satisfied based on determining that the load satisfies the load threshold, determining that the temperature satisfies the temperature threshold, determining that the pressure of the hydraulic fluids satisfies the pressure threshold, determine that a movement of machine 100 is detected, and/or determining that a steering command is detected, among other examples.

In some examples, based on determining that the one or conditions are not satisfied, machine controller 140 may determine that the machine data cannot be validated. For example, machine controller 140 may determine that the validation data cannot be generated to validate the machine data. Accordingly, machine controller 140 may enable an operation of machine 100 to be controlled based on the machine data. For example, machine controller 140 may enable the machine data to be provided with an indication that a validity (or an accuracy) of the machine data is unknown. For example, the machine data and the indication may be provided to one or more devices that are used to control the operation of machine 100.

Alternatively, machine controller 140 may determine that the one or more conditions are satisfied based on determining that the load does not satisfy the load threshold, determining that the temperature does not satisfy the temperature threshold, determining that the pressure of the hydraulic fluids does not satisfy the pressure threshold, determining that a movement of machine 100 is not detected, determining that a steering command is not detected, and/or among other examples. In other words, machine controller 140 may determine that machine 100 is operating under a stable state that may enable the machine data to be properly validated (e.g., without any interfering factor caused by the load, the temperature, the pressure, the movement, and/or the steering command).

Based on determining that the one or conditions are satisfied, machine controller 140 may determine whether the machine data is validated or not validated. For example, machine controller 140 may generate the validation data and use the validation data to validate the machine data. In some situations, machine controller 140 may generate the validation data using a physics based model. Machine controller 140 may generate the validation data periodically and/or based on a trigger.

In some implementations, the validation data may include validated pose data identifying the pose (e.g., the pose determined by machine controller 140 based on the second data) and/or validated velocity data identifying the velocity (e.g., the velocity determined by machine controller 140 based on the second data). In some examples, machine controller 140 may generate the validated pose data based on the operator controls data (e.g., the valve command data). Machine controller 140 may generate the validated velocity data based on the machine velocity data.

When validating the machine data, machine controller 140 may compare the machine data and the validation data to determine whether the machine data is accurate. For example, machine controller 140 may determine whether the one or more characteristics (indicated by the machine data) satisfy the one or more constraints (indicated by the validation data). The one or more constraints may include a constraint relating to an unexpected change in the machine data. For instance, machine controller 140 may determine whether an unexpected discrete increase in the pose data is detected (e.g., with respect to the validated pose data), whether an unexpected discrete increase in the velocity data is detected (e.g., with respect to the validated velocity data), among other examples.

Additionally, or alternatively, machine controller 140 may determine whether an unexpected flat line in the pose data is detected (e.g., with respect to the validated pose data), whether an unexpected flat line in the velocity data is detected (e.g., with respect to the validated velocity data), among other examples. Machine controller 140 may determine that the machine data does not satisfy the one or more constraints based on determining that the unexpected change in the machine data is detected.

The one or more constraints may include a constraint with respect to a traveling direction of machine 100. For example, machine controller 140 may determine whether a first traveling direction of machine 100 (indicated by the machine data) matches a second traveling direction of machine 100 (indicated by the validation data). As an example, the second traveling direction may be determined based on the operator controls data (e.g., based on the gear setting data indicating that machine 100 is in a forward gear or a reverse gear). Machine controller 140 may determine that the machine data does not satisfy the one or more constraints based on determining that the first traveling direction does not match the second traveling direction (e.g., the first traveling direction is opposite the second traveling direction).

The one or more constraints may include a constraint with respect to a pose threshold and a velocity threshold identified by the validation data. For example, machine controller 140 may determine whether the pose data satisfies the pose threshold and/or whether the velocity data satisfies the velocity threshold. Machine controller 140 may determine that the machine data does not satisfy the one or more constraints based on determining that the pose data does not satisfy the pose threshold and/or that the velocity data does not satisfy the velocity threshold. In some situations, machine controller 140 may be pre-configured with information identifying the pose threshold and the velocity threshold.

The one or more constraints may include a constraint with respect to kinematics associated with the pose. For example, machine controller 140 may determine whether the pose (identified by the pose data) is possible to be achieved by the one or more components. Machine controller 140 may determine that the machine data does not satisfy the one or more constraints based on determining that the pose is not possible to be achieved by the one or more components.

The one or more constraints may include a constraint with respect to a movement of machine 100. For example, machine controller 140 may compare the operator controls data (e.g., the gear setting data) and data from GPS device 184 to determine any discrepancy with respect to the movement of machine 100. In this regard, machine controller 140 may determine whether that the machine data does not satisfy the one or more constraints based on determining that GPS device 184 indicates a movement of machine 100 while the operator controls data indicates that machine 100 is stationary (e.g., a parking brake of machine 100 is engaged).

Machine controller 140 may determine a severity value based on whether the machine data satisfies the one or more constraints. In some situations, the severity value may be increased based on the machine data not satisfying the one or more constraints. Alternatively, the severity value may be decreased based on the machine data satisfying the one or more constraints. Machine controller 140 may determine whether the severity value satisfies a threshold in order to determine whether the machine data is validated or not validated. For example, machine controller 140 may determine that the machine data is validated based on the severity value satisfying the threshold for a first period of time. Alternatively, machine controller 140 may determine that the machine data is not validated based on the severity value not satisfying the threshold during a second period of time that is less than the first period of time.

In some implementations, the machine data may be configured to be used by one or more features of machine 100. For example, the machine data may be configured to be used by an autonomous feature of machine 100, by the transmission control system of machine 100, among other examples. In some examples, the autonomous feature may be used to control the one or more implements of machine 100. Based on determining that the machine data is validated, machine controller 140 may provide the machine data to enable the autonomous feature (e.g., to autonomously control the one or more implements), may provide the machine data to enable the transmission control system (e.g., to control the transmission of machine 100), among other examples.

Based on determining that the machine data is not validated, machine controller 140 may disable the one or more features that use the machine data. By disabling the one or more features that use the machine data, machine controller 140 may prevent the machine data from being used and, accordingly, may cause the operation of machine 100 to be controlled without the machine data. For example, machine controller 140 may cause a movement of machine 100 to be controlled without the machine data, may cause a movement of the one or more implements of machine 100 to be controlled without the machine data, among other examples. Additionally, or alternatively, machine controller 140 may provide the machine data with an indication that the machine data has not been validated.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
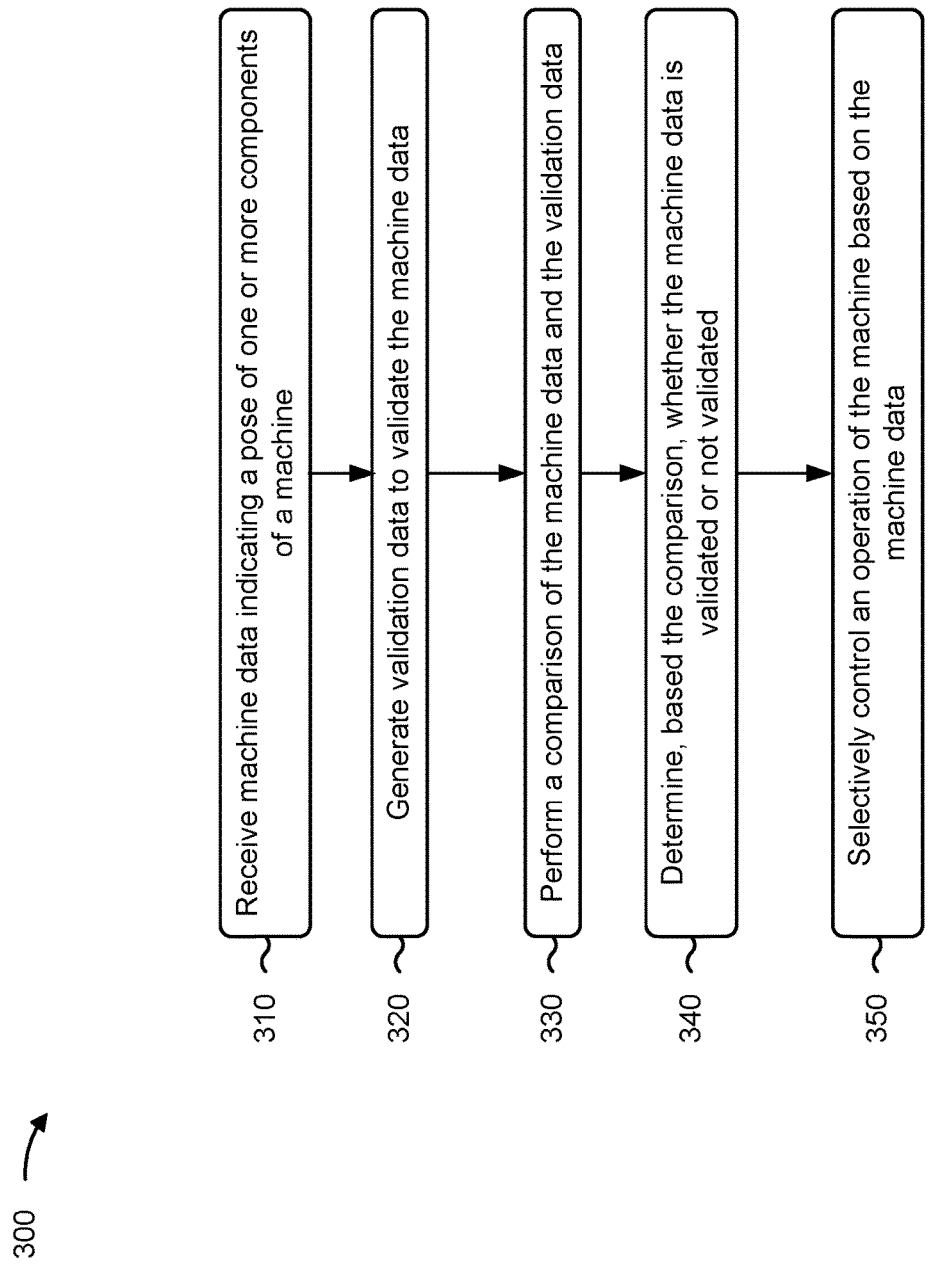
FIG. 3 is a flowchart of an example associated with controlling machine operation based on validation of machine data.

FIG. 3 is a flowchart of an example process 300 associated with controlling machine operation based on validation of machine data. In some implementations, one or more process blocks of FIG. 3 may be performed by a machine controller (e.g., machine controller 140). In some implementations, one or more process blocks of FIG. 3 may be performed by another device or a group of devices separate from or including the controller, such as a sensor system (e.g., sensor system 210), one or more IMUs (e.g., one or more IMUs 182), and/or a GPS device (e.g., GPS device 184).

As shown in FIG. 3, process 300 may include receiving machine data indicating a pose of one or more components of a machine, wherein the machine data is generated based on first data from one or more first sensor devices associated with the machine (block 310). For example, the controller may receive machine data indicating a pose of one or more components of a machine, wherein the machine data is generated based on first data from one or more first sensor devices associated with the machine, as described above.

The one or more components include an implement of the machine, wherein the pose of the one or more components includes at least one of a position of the implement or an orientation of the implement.

As further shown in FIG. 3, process 300 may include generating validation data to validate the machine data, wherein the validation data is generated based on second data from a second set of sensor devices, associated with the machine, different than the one or more first sensor devices (block 320). For example, the controller may generate validation data to validate the machine data, wherein the validation data is generated based on second data from a second set of sensor devices, associated with the machine, different than the one or more first sensor devices, as described above. The machine data further indicates a velocity of the machine.

As further shown in FIG. 3, process 300 may include performing a comparison of the machine data and the validation data (block 330). For example, the controller may perform a comparison of the machine data and the validation data, as described above.

As further shown in FIG. 3, process 300 may include determining, based the comparison, whether the machine data is validated or not validated (block 340). For example, the controller may determine, based the comparison, whether the machine data is validated or not validated, as described above.

Determining whether the machine data is validated or not validated may comprise determining whether the at least one of the position or the orientation is accurate based on the validation data. Determining whether the machine data is validated or not validated comprises determining whether the velocity is accurate based on the validation data.

The machine data is validated based on the machine data satisfying the one or more constraints during a first period of time, and the machine data is not validated based on the machine data not satisfying the one or more constraints during a second period of time that is less than the first period of time.

As further shown in FIG. 3, process 300 may include selectively controlling an operation of the machine based on the machine data, wherein, based on determining that the machine data is validated, the operation is controlled based on the machine data, and wherein the operation is controlled without the machine data based on determining that the machine data is not validated (block 350). For example, the controller may selectively control an operation of the machine based on the machine data, wherein, based on determining that the machine data is validated, the operation is controlled based on the machine data, and wherein the operation is controlled without the machine data based on determining that the machine data is not validated, as described above. In some implementations, the operation is controlled without the machine data based on determining that the machine data is not validated.

In some implementations, the machine data is configured to be used by an autonomous feature that controls the operation of the machine, and selectively controlling the operation of the machine comprises enabling the autonomous feature based on determining that the machine data is validated, and disabling the autonomous feature based on determining that the machine data is not validated.

Selectively controlling the operation of the machine comprises selectively controlling the operation of the machine based on the machine data, based on determining whether the at least one of the position or the orientation is accurate.

Selectively controlling the operation of the machine comprises selectively controlling the operation of the machine based on the machine data, based on determining whether the velocity is accurate.

Process 300 includes determining one or more conditions associated with the machine, wherein the one or more conditions include one or more of a load associated with the machine, a temperature of hydraulic fluids of the machine, a movement of the machine, wherein generating the validation data comprises generating the validation data based on the one or more conditions.

In some implementations, the machine data further indicates a velocity of the machine, wherein the validation data identifies one or more constraints associated with the pose and the velocity, and wherein determining whether the machine data is validated or not validated comprises determining whether the machine data satisfies the one or more constraints, wherein the machine data is validated based on the machine data satisfying the one or more constraints, and wherein the machine data is not validated based on the machine data not satisfying the one or more constraints.

In some implementations, determining whether the machine data satisfies the one or more constraints comprises determining whether an unexpected change, in the machine data, is detected, determining that the machine data is validated based on determining that an unexpected change in the machine data is not detected, and determining that the machine data is not validated based on determining that an unexpected change in the machine data is detected.

In some implementations, the machine data further indicates a first traveling direction of the machine, wherein the validation data indicates a second traveling direction of the machine, and wherein determining whether the machine data satisfies the one or more constraints comprises determining that the machine data is validated based on determining that the first traveling direction matches the second traveling direction, and determining that the machine data is not validated based on determining that the first traveling direction does not match the second traveling direction.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

Implementations described herein are directed to validating machine data that indicates characteristics of a machine. For example, implementations described herein are directed to a device (e.g., a machine controller) that generates validation data that identifies constraints associated with the characteristics. The device may validate the machine data based on the validation data.

The characteristics may include an estimated pose of one or more components of the machine (e.g., a blade assembly, a ripper assembly, and a chassis of the machine). Additionally, or alternatively, the estimated characteristics may include an estimated velocity of the machine. The estimated pose may include a position and/or an orientation of the one or more components.

In some situations, the estimated pose and/or the estimated velocity may be inaccurate. Operating the machine based on inaccurate data may result in the machine performing unintended operations. Such unintended operations may cause damage to the machine and/or to other machines.

By validating the machine data as described herein, the device (e.g., the machine controller) may prevent the machine from performing unintended operations. By preventing the machine from performing unintended operations, the device may prevent damage to the machine and/or to other machines.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a device, the method comprising:
   receiving machine data indicating a pose of one or more components of a machine, wherein the machine data is generated based on first data from one or more first sensor devices associated with the machine;
   generating validation data to validate the machine data, wherein the validation data is generated based on second data from a second set of sensor devices, associated with the machine, different than the one or more first sensor devices;
   performing a comparison of the machine data and the validation data;
   determining, based on the comparison, whether the machine data is validated or not validated,
      wherein the one or more components include an implement of the machine,
      wherein the pose of the one or more components includes a pose of the implement, and
      wherein determining whether the machine data is validated or not validated comprises:
         determining whether the pose of the implement is accurate based on the validation data; and
   selectively controlling an operation of the machine based on the machine data based on determining whether the pose of the implement is accurate.

2. The method of claim 1, wherein the machine data is configured to be used by an autonomous feature that controls the operation of the machine, and
   wherein selectively controlling the operation of the machine comprises one of:
      enabling the autonomous feature when the pose of the implement is accurate, or
      disabling the autonomous feature when the pose of the implement is inaccurate.

3. The method of claim 1,
   wherein the pose of the implement includes at least one of a position of the implement or an orientation of the implement.

4. The method of claim 1,
   wherein the machine data further indicates a velocity of the machine,
   wherein determining whether the machine data is validated or not validated further comprises:
      determining whether the velocity is accurate based on the validation data.

5. The method of claim 1, further comprising:
   determining one or more conditions associated with the machine,
      wherein the one or more conditions include one or more of a load associated with the machine, a temperature of hydraulic fluids of the machine, or a movement of the machine, and
      wherein generating the validation data comprises:

generating the validation data based on the one or more conditions.

6. The method of claim 1,
wherein the machine data further indicates a velocity of the machine,
wherein the validation data identifies one or more constraints associated with the pose of the implement and the velocity, and
wherein determining whether the machine data is validated or not validated further comprises:
determining whether the velocity satisfies a constraint of the one or more constraints.

7. The method of claim 1,
wherein the machine data includes pose data that identifies the pose of the implement,
wherein the validation data includes validation pose data, and
wherein determining whether the pose of the implement is accurate comprises:
determining whether the pose of the implement is accurate based on whether an unexpected change, in the pose data, is detected with respect to the validated pose data.

8. The method of claim 1,
wherein the machine data further indicates a first traveling direction of the machine,
wherein the validation data indicates a second traveling direction of the machine, and
wherein determining whether the machine data is validated further comprises:
determining whether the first traveling direction matches the second traveling direction.

9. A device, comprising:
one or more memories; and
one or more processors configured to:
receive machine data indicating a pose of one or more components of a machine and indicating a velocity of the machine, wherein the machine data is based on first data from one or more first devices associated with the machine;
generate validation data to validate the machine data, wherein the validation data is based on second data from a second set of devices, associated with the machine, different than the one or more first devices;
determine, based on the validation data, whether the machine data is accurate; and
selectively control an operation of the machine based on whether the machine data is accurate.

10. The device of claim 9, wherein the machine data is configured to be used by a transmission control system of the machine, and
wherein, to selectively control the operation of the machine, the one or more processors are configured to:
enable the transmission control system when the machine data is accurate.

11. The device of claim 9, wherein, to generate the validation data, the one or more processors are configured to:
generate the validation data using a physics based model.

12. The device of claim 9,
wherein the validation data identifies one or more constraints associated with the pose and the velocity, and
wherein, to determine whether the machine data is accurate, the one or more processors are configured to:
determine whether the machine data satisfies the one or more constraints during a first period of time and during a second period of time that is less than the first period of time.

13. The device of claim 12, wherein the one or more processors are further configured to:
determine a severity value based on determining whether the machine data satisfies the one or more constraints; and
wherein, to determine whether the machine data is accurate, the one or more processors are further configured to:
determine whether the severity value satisfies a threshold; and
determine whether the machine data is accurate based on determining whether the severity value satisfies the threshold.

14. A system comprising:
one or more first devices associated with a machine;
a second set of devices, associated with the machine, that are different than the one or more first devices; and
a machine controller configured to:
receive machine data indicating one or more characteristics of the machine, wherein the machine data is based on first data from the one or more first devices;
generate validation data based on second data from the second set of devices;
determine, based on the validation data, whether the machine data is accurate; and
control an operation of the machine based on the machine data when the machine data is validated and without the machine data when the machine data is not validated.

15. The system of claim 14, wherein the one or more first devices includes a global positioning system (GPS) device and one or more inertial measurement units (IMUs), and
wherein the second set of devices includes a velocity sensor device, a load sensor device, a pressure sensor device, and one or more operator controls.

16. The system of claim 14, wherein the one or more characteristics of the machine include a pose of one or more components of the machine and a velocity of the machine,
wherein the validation data identifies one or more constraints associated with the pose and the velocity, and
wherein, to determine whether the machine data is accurate, the machine controller is configured to:
determine whether the machine data satisfies the one or more constraints.

17. The system of claim 16, wherein the machine data includes pose data identifying the pose and velocity data identifying the velocity, and
wherein, to determine whether the machine data satisfies the one or more constraints, the machine controller is configured to at least one of:
determine whether the pose data satisfies a pose threshold identified by the validation data, or
determine whether the velocity data satisfies a velocity threshold identified by the validation data.

18. The system of claim 16, wherein, to determine whether the machine data is accurate, the machine controller is further configured to:
determine a severity value based on whether the machine data satisfies the one or more constraints; and
determine whether the machine data is accurate based on the severity value.

19. The system of claim 18, wherein, to determine whether the machine data is accurate based on the severity value, the machine controller is configured to:
- determine whether the severity value satisfies a threshold; and
- determine whether the machine data is accurate based on determining whether the severity value satisfies the threshold.

20. The system of claim 14, wherein the machine data is configured to be used by an autonomous feature that controls the operation of the machine, and
- wherein, to control the operation of the machine, the machine controller is configured to:
  - disable the autonomous feature when the machine data is not accurate.

* * * * *